United States Patent [19]

Freen

[11] 3,746,999

[45] July 17, 1973

[54] INTERFERENCE AVOIDANCE SUPERREGENERATIVE RECEIVER

[75] Inventor: Philip Freen, Ft. Lauderdale, Fla.

[73] Assignee: Teletron, Inc., Fort Lauderdale, Fla.

[22] Filed: Apr. 1, 1971

[21] Appl. No.: 130,246

[52] U.S. Cl. .................. 325/429, 325/418, 325/419, 329/170, 331/174

[51] Int. Cl. .............................................. H04b 1/16

[58] Field of Search.................... 325/418, 419, 428, 325/429; 329/170; 331/174

[56] References Cited

UNITED STATES PATENTS

| | | | |
|---|---|---|---|
| 3,337,807 | 8/1967 | Brown | 325/429 |
| 3,359,558 | 12/1967 | Schanbacher | 325/429 |
| 2,613,316 | 10/1952 | Loughlin | 325/429 |

*Primary Examiner*—Albert J. Mayer
*Attorney*—Schellin & Hoffman

[57] ABSTRACT

The audio output of an essentially conventional superregenerative receiver is rectified and connected back through a resistor to the capacitor of the quench oscillation circuit and to ground across a capacitor and resistor in parallel. This arrangement causes the quench frequency to vary with the detection of audio modulation, and the shift of local quench frequency avoids sustained detection of the incorrect signal. The interference signal may be the quench frequency of a nearby receiver. A capacitor is situated in the feedback circuit to prevent a shift of two receivers to the same, stable condition.

19 Claims, 3 Drawing Figures

PATENTED JUL 17 1973 3,746,999

INVENTOR
PHILIP FREEN

BY Schellin & Hoffman
ATTORNEYS

INTERFERENCE AVOIDANCE SUPERREGENERATIVE RECEIVER

BACKGROUND OF THE INVENTION

This invention is related to superregenerative receivers. More specifically, it relates to such receivers designed to avoid the effects of interference from signals such as those from other such receivers or similar interfering signals.

A basic element of conventional superregenerative receivers is the generation of quench oscillations which are employed to release and inhibit a regenerative circuit. Unless such a receiver is exceptionally well shielded (at corresponding expense) the quench oscillations will be radiated to some extent.

At a nearby receiver the radiated oscillations will interact with local oscillations. In accordance with well known principles, two oscillations may interact or "beat" together to produce sum and difference signals, as well as other signals related to the original two signals. In a superregenerative receiver, such beat signals may be similar enough to the modulation being detected to constitute noise and interfere with good reception. Signals capable of producing similar interference may come from other sources.

Such mutual interference is particularly probable where two identical receivers are located in close proximity. The two quench frequencies generally will differ slightly because of variations in individual components and conditions of use. Each receiver locally generates a quench frequency which has the capacity of beating with the nearby quench frequency to produce audio signals. In automatic garage door opening installations for apartments and the like, identical receivers of this nature are often mounted in fixed positions close together.

With the possible exception of shielding against radiation as a matter of general, good design, no prior art directed to this problem is known.

SUMMARY OF THE INVENTION

It is an object of this invention to provide a superregenerative receiver which is resistant to the effects of interference having a frequency about that of the quench frequency of the receiver.

It is an object of this invention to provide a superregenerative receiver which is resistant to interference from external oscillations.

It is also an object of this invention to provide a superregenerative receiver particularly well suited for use in close proximity to superregenerative receivers of the same kind, from which quench oscillations may be radiated.

In accordance with this invention a superregenerative receiver having a quench-frequency-determining circuit also comprises a feedback circuit from a modulation-detection circuit to the quench-frequency-determining circuit. A detected signal thereby varies the quench frequency. A detected output signal produced by a beat with the quench oscillations is thus sustained only momentarily. To assure a dynamic action, the feedback circuit contains a capacitor to block a direct current feedback.

Other characteristics of the invention and objects, features and advantages of it will be apparent from a consideration of the following description of the preferred embodiment of the invention, as illustrated by the accompanying drawing:

DESCRIPTION OF THE PREFERRED EMBODIMENT

Figure 1:
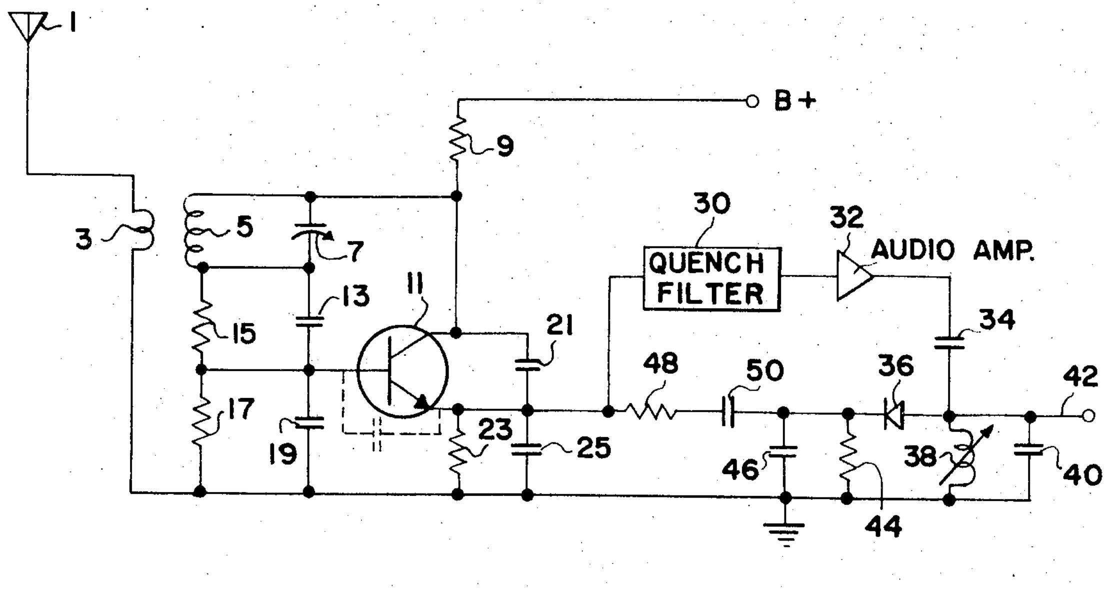
FIG. 1 is a circuit diagram illustrating the electrical design of a receiver in accordance with the invention.

The preferred circuit in accordance with this invention, illustrated in FIG. 1, includes a superregenerative detector of basically conventional design having a regenerative circuit and a quench-frequency-determining circuit. The preferred receiver is designed to receive 300 megacycle carrier frequencies which are amplitude modulated with signals in the audio range. The quench frequency is about 500 kilocycles.

Thus, received signals are responded to by antenna 1 in the conventional manner and carried to ground through coupling coil 3. Coupling coil 3 is inductively linked to coil 5, and coil 5 is in a parallel circuit with capacitor 7. Capacitor 7 is adjustable, and the parallel circuit is tuned to 300 megacycles, the carrier frequency.

One of the coil 5 and capacitor 7 junction points is connected through a 10K resistor 9 to a positive potential source. That point is also connected to the collector of a transistor 11. The other junction of coil 5 and capacitor 7 is connected through a 27 picofarad capacitor 13 to the base of the transistor 11.

A 68K resistor 15 is connected in parallel with capacitor 13 and is connected to ground through 100K resistor 17. Resistors 15 and 17 serve as a direct current voltage divider so as to provide the necessary bias to transistor 11. A 0.01 microfarad capacitor 19 is connected across the resistor 17 to provide a low impedance source of potential with respect to the 300 megacycle frequencies.

A 1 picofarad capacitor 21 is connected across the collector-emitter junction of transistor 11 to provide a feedback in the regenerative circuit. Also an important element in that feedback operation is the 3 to 4 picofarad inherent capacity of the base-emitter junction of transistor 11, shown in the drawing by dotted outline.

The quench-frequency-determining circuit comprises 27K resistor 23 and 0.001 microfarad capacitor 25 connected in parallel from the emitter of transistor 11 to ground. This circuit normally produces oscillations at the frequency of about 500 kilocycles with current to it being through the emitter of transistor 11 and capacitor 21 (current through capacitor 21 is quite small at the quench frequency).

The elements just described constitute a standard super-regenerative system made up of an regenerative circuit by which signals coupled to coil 5 from antenna 1 produce corresponding signals at the base of transistor 11. When the quench oscillations permit,these signals are current amplified across transistor 11. The amplified signals are returned to the base of transistor 11 through capacitor 21 and the inherent base-emitter capacity of transistor 11. Oscillations then begin to build up towards self-sustaining levels.

The quench oscillations from emitter to ground at 500 kilocycles alternately permit and inhibit signals from passing from base to emitter. During part of the quench oscillations the emitter of transistor 11 is forward biased and the amplification in response to received signals occurs. During the other part of the quench oscillations the quench signals reverse bias transistor 11 and thereby stop amplification of incoming signals. This prevents the amplified oscillations from building up to a saturated, steady-state level.

The emitter of transistor 11 is connected to a quench filter 30, which blocks signals in the 500 kilocycles range, and the output of the quench filter is connected to an audio amplifier 32. Audio amplifier 32 is connected through a coupling capacitor 34 to the junction of diode 36 and a parallel circuit of variable inductance 38 and capacitor 40. The output terminal 42 of the receiver is connected to the junction of diode 36, inductance 38, and capacitor 40. The parallel circuit of inductance 38 and capacitor 40 is tuned to the frequency of the audio modulation signals to be received which can also be referred to as the desired modulation frequency, since the receiver is tuned to respond to modulation frequencies in its vicinity and not to other modulation frequencies. The signals on output terminal 42 may be rectified in a standard detector circuit.

Audio signals from amplifier 32 are half-wave rectified by diode 36, and the half-wave signals are connected to ground through the parallel circuit of 470K resistor 44 and 0.001 micorfarad capacitor 46. A 100K resistor 48 and 0.01 microfarad capacitor 50 are connected in series between the emitter side of quench-frequency-determining circuit elements resistor 23 and capacitor 25, and the diode 36 side of capacitor 46.

These elements with the exception of capacitor 50, will be recognized as essentially a conventional detector circuit. That is, signals are rectified by diode 36 and the envelope peaks are smoothed by the interaction of capacitor 46, resistor 48, and resistor 44. Capacitor 50 presents a negligibly low impedance to the audio frequencies detected, but acts to prevent static feedback conditions.

Figure 2:
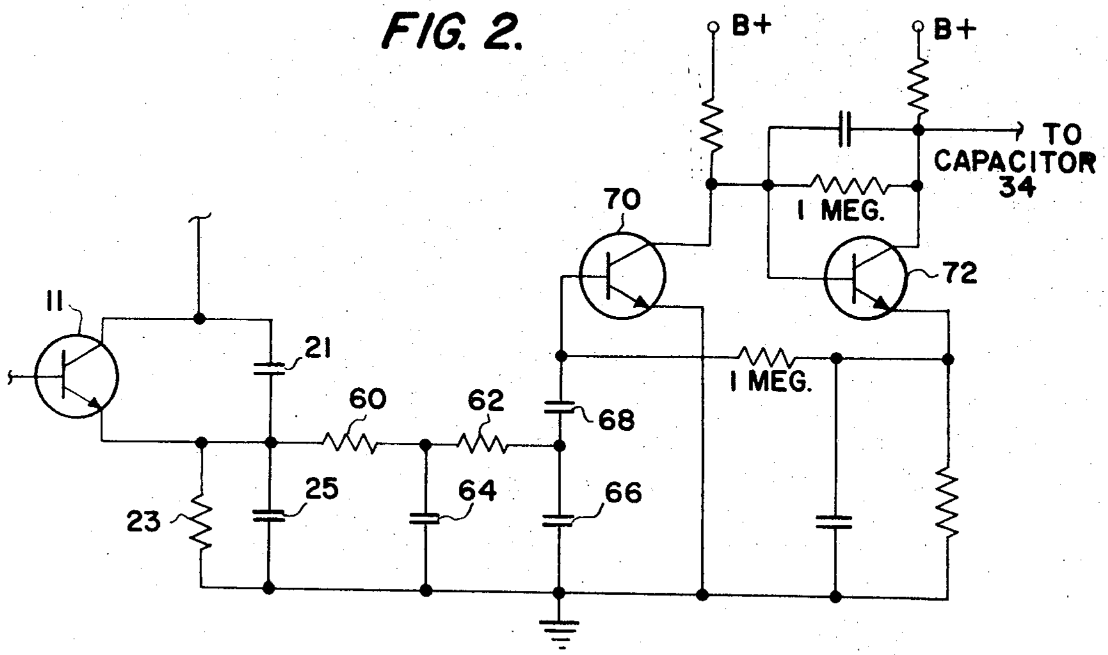
FIG. 2 illustrates some details of the quench filter and the audio amplifier of FIG. 1.

Although no significant novelty is claimed for the quench filter 30 and the audio amplifier 32 per se, they are shown in some detail in FIG. 2 for convenience in describing the preferred embodiment. The quench filter 30 is simply a network of two, 3.3K resistors 60 and 62 connected to the emitter side of capacitor 25. The junction of the resistors 60 and 62 and the end location of their series connection are each connected to ground through 0.001 microfarad capacitors 64 and 66. This network is effective to pass signals in the audio range to coupling capacitor 68, while blocking the quench frequencies of 500 kilocycles. The audio amplifier element comprises two stages including transtor 70 and transistor 72, in essentially conventional configuration.

OPERATION OF INVENTION IN PREFERRED EMBODIMENT

Signals produced at the emitter of transistor 11 are removed of quench frequency components at filter 30 and amplified at 32. The signals appear as audio output signals at terminal 42. Such signals will be continued only momentarily, however, if they are spuriously caused by a beat with the quench frequency.

The audio signals are rectified by diode 36 and envelope smoothed by the network comprising capacitor 46 and resistors 44 and 48. These signals are fed back to the emitter junction of resistor 23 and capacitor 25 of the quench-frequency-determining circuit, where they are effective to reduce quench frequency. With the change in quench frequency, spurious signals caused by beat with the quench signals are terminated or changed continually in frequency so that they do not appear sustained in time as do intelligence signals. Thus the feedback circuit constitutes a quench-freqncy-varying means which continuously changes the quench frequency in response to detected modulation to eliminate interference from signals in the quench frequency range which when combined with the quench frequency produce a beat frequency in the vicinity of the desired modulation frequency. The beat frequency must be in the vicinity of the desired modulation frequency before the quench frequency is changed because otherwise the tuned circuit consisting of inductor 38 and capacitor 40 presents a low impedance which essentially by-passes the feedback network. True modulation signals are not influenced in character by quench frequency and therefore are continually transferred to the output 42 without distortion caused by variations in the quench frequency.

Figure 3:
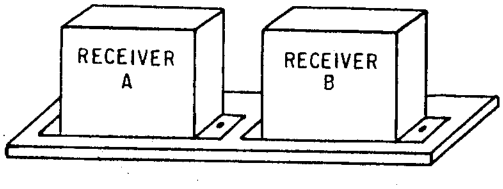
FIG. 3 illustrates two receivers (A and B), each in accordance with this invention, mounted in close proximity for simultaneous operation.

Capacitor 50 prevents the feedback of static signals. Accordingly, no sustained beat frequency from quench oscillations can occur. When interference is because of radiations of quench oscillations from a substantially identical nearby receiver, such as occurs when both receivers A and B of FIG. 3 are operating, capacitor 50 prevents a basically identical shift of both receivers to the same, steady-state condition at which interference would continue.

Of course, the networks past transtor 11 in the regenerative circuit are not tuned to the 300 megacycle carrier frequency and that signal is not transmitted to the output.

It will be recognized that circuits in accordance with the invention can take a wide variation in forms, some of which might include improvements or the employment of inventive skill over the embodiment described, but all being within the substance and scope of this invention, and that therefore patent protection should not be limited by specific details described, but should be commensurate with the substance of the invention, defined with particular reference to the accompanying claims.

What is claimed is:

1. A superregenerative receiver comprising:

a regenerative circuit responsive to input signals and having a quench-frequency-determining circuit;

a modulation detection circuit responsive to signals from the regenerative circuit; and, quench-frequency-varying feedback circuit means connected to the quench frequency determining circuit for continuously changing the quench frequency of the regenerative circuit in response to detected modulation to eliminate interference from signals in the quench frequency range which when combined with the quench frequency produce a beat frequency in the vicinity of the desired modulation frequency, whereby when a beat frequency in the vicinity of the desired modulation frequency is received, the quench frequency is changed to move the beat frequency away from the desired modulation frequency to prevent response to quenching beat frequencies.

2. The receiver as in claim 1 in which said modulation-detection circuit and said feedback circuit together comprise at least one rectifier and said feedback circuit is connected to feed back rectified signals.

3. The receiver as in claim 2 in which said feedback circuit also comprises a smoothing capacitor connected in parallel with said quench-frequency-determining circuit and a resistor connected in series between said smoothing capacitor and said quench-frequency-determining circuit, said smoothing capacitor being connected past said rectifier so that rectified, smoothed signals are fed back.

4. The circuit as in claim 1 in which said feedback circuit comprises a direct current blocking element which passes alternating current feedback signals.

5. The receiver as in claim 1 in which said quench-frequency-determining circuit comprises a resistor and a capacitor connected in parallel and said feedback circuit is connected to vary the charge on said capacitor.

6. The receiver as in claim 5 in which said modulation-detection circuit and said feedback circuit together comprise at least one rectifier and said feedback circuit is connected to feed back rectified signals.

7. The receiver of claim 1 wherein the feedback circuit is passive.

8. The receiver as in claim 6 in which said feedback circuit comprises a blocking capacitor to block direct current and pass alternating current feedback signals.

9. The receiver as in claim 8 in which said feedback circuit also comprising a smoothing capacitor connected in parallel with said quench-frequency-determining circuit and a resistor connected in series between said smoothing capacitor and said quench-frequency-determining circuit, said smoothing capacitor being connected past said rectifier so that rectified, smoothed signals are fed back.

10. A superregenerative receiver comprising: a regenerative transistor amplifier having a parallel RC quench-frequency-determining circuit; a modulation-detection circuit connected to the output of the amplifier; quench-frequency-varying feedback circuit means having its input connected to the modulation-detection circuit and having its output connected to the quench-frequency-determining circuit for continuously changing the quench frequency of the regenerative circuit in response to detected modulation to eliminate interference from signals in the quench frequency range which when combined with the quench frequency produce a beat frequency in the vicinity of the desired modulation frequency, whereby when a beat frequency in the vicinity of the desired modulation frequency is received, the quench frequency is changed to move the beat frequency away from the desired modulation frequency to prevent response to quenching beat frequencies; said modulation-detection circuit and feedback circuit together comprising at least one rectifier; said feedback circuit comprising: a smoothing capacitor in parallel with the capacitor of the quench-frequency-determining circuit, a resistor and blocking capacitor in series between the smoothing capacitor and the quench-frequency-determining circuit, and said smoothing capacitor being connected between the rectifier and the quench-frequency-determining circuit to smooth rectified signals fed back to the quench-frequency-determining circuit.

11. Apparatus comprising two superregenerative receivers fixedly mounted in close proximity for simultaneous operation, each receiver comprising:

a regenerative circuit responsive to input signals and having a quench-frequency-determining circuit;

a modulation-detection circuit responsive to signals from the regenerative circuit, and;

quench-frequency-varying feedback circuit means connected to the quench-frequency-determining circuit for continuously changing the quench frequency of the regenerative circuit in response to detected modulation to eliminate interference from the quench frequency of the other receiver, which results when the quench frequencies of the two receivers combine to produce a beat frequency in the vicinity of the desired modulation frequency, whereby when a beat frequency in the vicinity of the desired modulation frequency is detected, the quench frequency of the detecting receiver is changed to move the beat frequency away from the desired modulation frequency to prevent response to quenching beat frequencies.

12. The apparatus of claim 11 wherein in each receiver the modulation-detection circuit and the feedback circuit together comprise at least one rectifier and said feedback circuit is connected to feedback rectified signals.

13. The apparatus of claim 12 wherein in each receiver said feedback circuit also comprises a smoothing capacitor connected in parallel with said quench-frequency-determining circuit and a resistor connected in series between said smoothing capacitor and said quench-frequency-determining circuit, said smoothing capacitor being connected past said rectifier so that rectified smoothed signals are fed back.

14. The apparatus of claim 11 wherein in each amplifier the feedback circuit comprises a direct current blocking element which passes alternating current feedback signals whereby the two receivers are prevented from reaching a steady state condition wherein the beat frequency of the two quenching frequencies is being detected as a modulation signal.

15. The apparatus of claim 11 wherein in each receiver, the quench-frequency-determining circuit comprises a resistor and a capacitor connected in parallel and said feedback circuit is connected to vary the charge on said capacitor.

16. The apparatus as in claim 15 wherein in each receiver, the modulation-detection circuit and the feedback circuit together comprise at least one rectifier and said feedback circuit is connected to feed back rectified signals.

17. The apparatus of claim 16 wherein in each receiver, said feedback circuit comprises a blocking capacitor to block direct current and pass alternating current feedback signals whereby the two receivers are prevented from reaching a steady state condition wherein the beat frequency of the two quenching frequencies is detected as a modulation signal.

18. The apparatus of claim 17 wherein in each receiver, said feedback circuit also comprises a smoothing capacitor connected in parallel with said quench-frequency-determining circuit and a resistor connected in series between said smoothing capacitor and said quench-frequency-determining circuit, said smoothing capacitor being connected past said rectifier so that rectified, smoothed signals are fed back.

19. Apparatus comprising two superregenerative receivers fixedly mounted in close proximity for simultaneous operation, each receiver comprising:

- a regenerative transistor amplifier having a parallel RC quench-frequency-determining circuit;
- a modulation-detection circuit connected to the output of the amplifier;
- quench-frequency-varying feedback circuit means having its input connected to the modulation-detection circuit and having its output connected to the quench frequency determining circuit for continuously changing the quench frequency of the regenerative amplifier in response to detected modulation to eliminate interference from the quench frequency of the other receiver, which results when the quench frequencies of the two receivers combine to produce a beat frequency in the vicinity of the desired modulation frequency, whereby when a beat frequency in the vicinity of the desired modulation frequency is detected, the quench frequency of the detecting receiver is changed to move the beat frequency away from the desired modulation frequency to prevent response to quenching beat frequencies;

said modulation-detection circuit and feedback circuit together comprising at least one rectifier;

said feedback circuit comprising:

- a smoothing capacitor in parallel with the capacitor of the quench-frequency-determining circuit,
- a resistor and blocking capacitor in series between the smoothing capacitor and the quench-frequency-determining circuit, and said smoothing capacitor being connected between the rectifier and the quench-frequency-determining circuit to smooth rectified signals fed back to the quench-frequency-determining circuit.

* * * * *